No. 785,012. PATENTED MAR. 14, 1905.
A. A. LOW.
BOTTLE.
APPLICATION FILED MAR. 15, 1904.
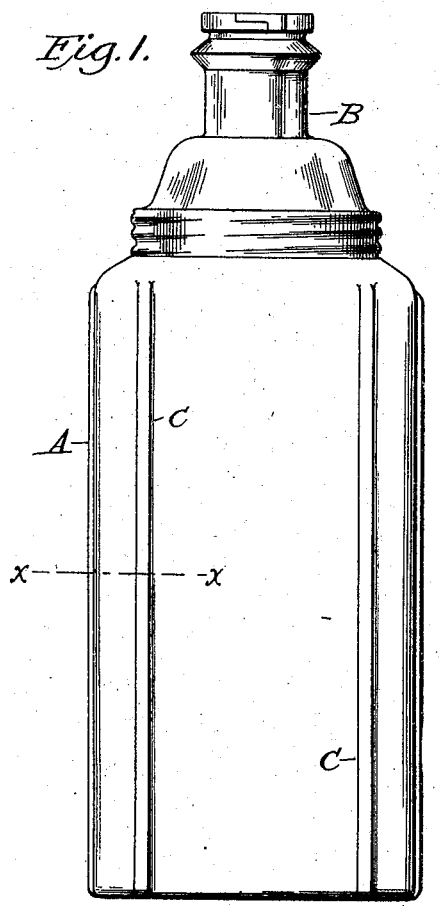
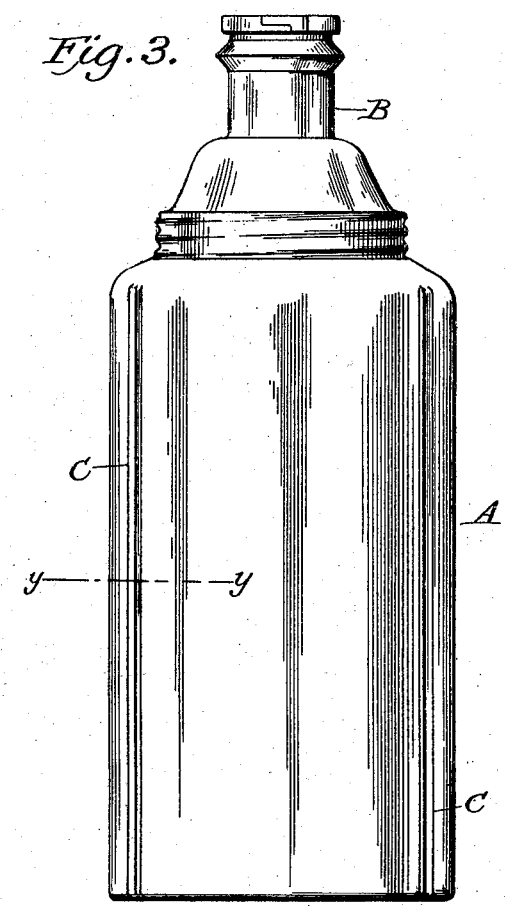
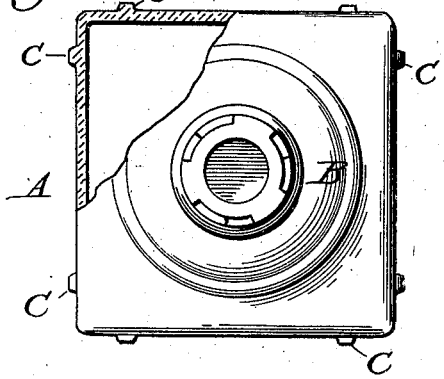
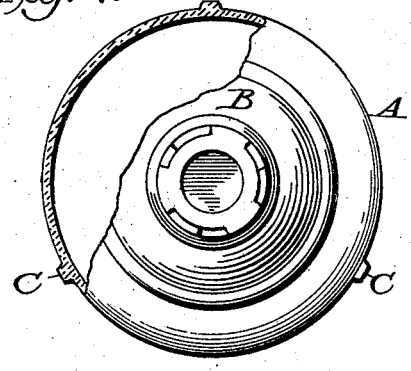
Witnesses
James F. Duhamel
John A. Hicks
Inventor
Abbot Augustus Low
By his Attorney
James M. Hicks No. 785,012. Patented March 14, 1905.

UNITED STATES PATENT OFFICE.

ABBOT AUGUSTUS LOW, OF HORSESHOE, NEW YORK, ASSIGNOR TO THE AUTO STOPPER COMPANY, OF NEW YORK, N. Y.

BOTTLE.

SPECIFICATION forming part of Letters Patent No. 785,012, dated March 14, 1905.

Application filed March 15, 1904. Serial No. 198,189.

*To all whom it may concern:*

Be it known that I, ABBOT AUGUSTUS LOW, a citizen of the United States, and a resident of Horseshoe, in the county of St. Lawrence and State of New York, have invented certain new and useful Improvements in Bottles, of which the following is a specification.

My invention relates to bottles; and it consists in certain elements in combination fully specified and claimed hereinafter.

In order that those skilled in the art to which my invention appertains may understand, construct, and use my invention, I will proceed to describe it, referring to the accompanying drawings, in which—

Figure 1 is an elevation of a bottle having a rectangular body in cross-section. Fig. 2 is a partial cross-section of Fig. 1 on line X X. Fig. 3 is an elevation of a bottle having round body in cross-section, and Fig. 4 is a partial cross-section of Fig. 3 on lines Y Y.

A is the body of the bottle in each figure.

B is the neck.

C represents ribs raised upon the outer surface of the body A and running longitudinally of the body A substantially throughout the whole length thereof. I have shown the ribs C at convenient places in the several figures; but I do not confine myself to the exact location of these ribs. These ribs serve two purposes. They primarily serve to afford a gripping-surface by which to grasp the bottle in pouring out the contents thereof, especially in bottles of large size, which must be grasped by one hand in pouring. Secondarily they serve as guards to protect the body of the bottle from breaking in shipment. These ribs all terminate near the top of the body of the bottle and begin near the base thereof.

Having now fully described my invention and the manner in which I have embodied it, what I claim as new and as my invention, and desire to secure by Letters Patent, is—

In a bottle, the combination with the body thereof, of longitudinal ribs extending substantially throughout the length of the body, and raised from the surface of said body, whereby the hand may readily grasp the bottle firmly in pouring its contents, and to serve as a protection while in transportation, substantially as specified.

Signed at New York, in the county of New York and State of New York, this 17th day of February, A. D. 1904.

ABBOT AUGUSTUS LOW.

Witnesses:
 GEO. C. CONDIT,
 GEO. WELLING GIDDINGS.